Figure 1:

C. L. WATSON.
METHOD OF PRESERVING GREEN CORN ON THE COB.
APPLICATION FILED SEPT. 16, 1911.

1,013,244.

Patented Jan. 2, 1912.

Witnesses:

C. L. Watson,
Inventor,
by C. A. Snow & Co.
Attorneys.

UNITED STATES PATENT OFFICE.

CLEM L. WATSON, OF McALESTER, OKLAHOMA.

METHOD OF PRESERVING GREEN CORN ON THE COB.

1,013,244.  Specification of Letters Patent.  Patented Jan. 2, 1912.

Application filed September 16, 1911. Serial No. 649,767.

*To all whom it may concern:*

Be it known that I, CLEM L. WATSON, a citizen of the United States, residing at McAlester, in the county of Pittsburg and State of Oklahoma, have invented a new and useful Method of Preserving Green Corn on the Cob, of which the following is a specification.

This invention relates to a method of preserving and standardizing green corn on the cob, and the article produced thereby.

As is well known, purchasers of green cob corn will not accept ears merely from an external inspection, but insist that several rows of the grains be exposed in order to judge accurately of the quality of the corn. To accomplish this, it is the almost universal practice for the vender to cut transversely into the ear, near its tassel end, and then to strip back a width of the husk, thus exposing the grains to view. This procedure is objectionable for several reasons, the principal one being that it is unsanitary, since, if the ear be rejected, the scar inflicted leaves an opening for the entrance of dust and insects, and thus renders the corn a menace to health. Furthermore, it entails a loss to the dealer, as the exposed rows of grains soon dry and shrivel, so as to destroy the appearance of the ear, thereby materially depreciating its selling value, if not entirely destroying its sale. Furthermore, green corn as commonly exposed for sale, has the tassel intact, and this not only provides a lodging place for vermin and filth, but is also objectionable, since, in handling the ears, the tassel becomes detached and litters the bin and the surrounding floor. Aside from this, the presence of the tassel is unnecessary, as is also the length of stalk generally left at the butt end of the cob. These portions of the cob add materially to the weight of the product, and consequently to the cost of shipping, and further, detract largely from the appearance of the stacked product when exposed for sale, the cobs of corn being of irregular lengths.

The object of the present invention is, in a ready and practical manner, so to prepare the cob corn, or so-called "roasting ears," that easy inspection of the grains to determine whether the ear is filled or not, and to determine whether it contains worms, may readily be effected by the vender, these operations being carried out without rendering the corn in any wise unsanitary.

A further object of the invention is to standardize the lengths of the ears, thus to give them a uniform appearance, and also to secure a substantial reduction in the size of the crates or holders in which they are shipped, thereby effecting a saving in the cost of transportation.

A further object of the invention is to provide a novel seal for closing the ends of the cob, upon which seal may be displayed the name of the producer, and his printed guarantee of the uniform excellence of the article, the caps or closures being held upon the ear by an adhesive, which, while harmless to human beings, will prove repellent to insects and cause them to shun the ears equipped with the closures.

With the above and other objects in view, as will appear as the nature of the invention is better understood, the same consists, generally stated, in a method of preserving green corn upon the ear, of presenting it in such manner as, without any deterioration of the product, to permit inspection of the grains, and to standardize the lengths of the ears, the method consisting of cutting off a length of the tassel end sufficient to expose the grain, and severing the stalk close to the butt end of the ear, and then inclosing the ends in caps which are held upon the ear by an adhesive repellent to insects.

The invention consists further in the various steps of the method leading up to the final result, as will be hereinafter fully described and claimed.

In the accompanying drawings forming a part of this specification, and in which like characters of reference indicate corresponding parts, there is illustrated, somewhat in the nature of a diagram, the various steps observed in treating an ear of green corn and presenting it in a manner which shall carry out the method, and in these drawings,—

Figure 2:
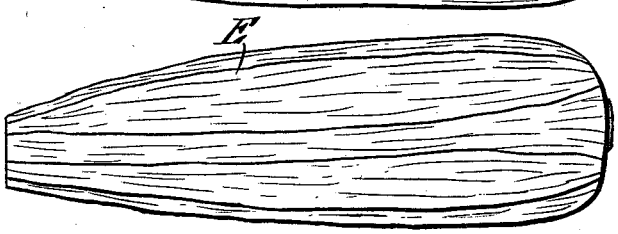
Figures 3, 4:
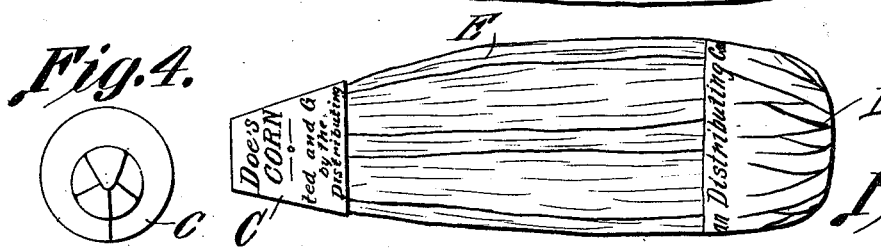
Figure 5:
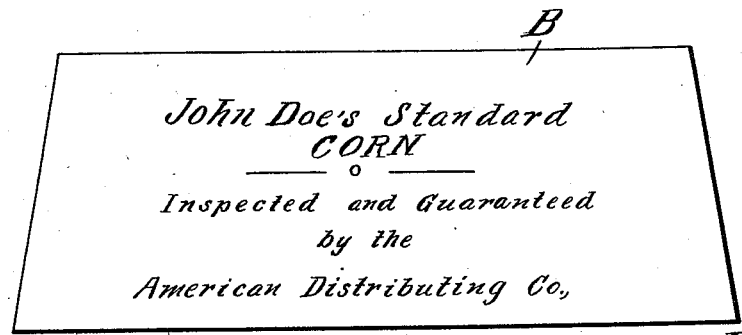
Figure 6:
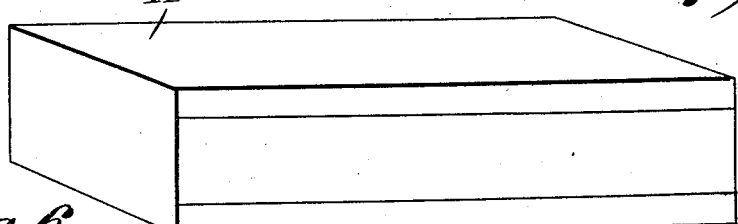

Figure 1 is a view in side elevation displaying an ear of green corn as it appears as ordinarily exposed for sale. Fig. 2 is a similar view showing an ear denuded of its tassel end and clipped at its stalk end. Fig. 3 is a similar view showing the ear equipped with the protective caps which inclose the severed ends; Fig. 4 is an end view of the cap or closure; Fig. 5 is a detail view of the blank employed in making the cap or closure. Fig. 6 is a perspective detail view of one form of box or crate that may be employed in shipping the standardized ears.

In carrying the invention into effect, each ear E is taken, and a length of its tassel end T is severed, sufficient to expose the rows of grains to view, in order to enable the operator to determine whether the ear is full or not, and whether or not it contains worms, it being well known that the corn worm always enters from the tassel end. The stalk end S is then severed close to the butt of the ear, presenting thereby the article shown in Fig. 2. In order to standardize the ears, a suitable machine may be employed which will sever the tassel and stalk ends at one operation, so that any number of ears will be of the same length. After the tassel end has been severed, the producer inspects it, and if the ear is found imperfect, as from lack of filling, or the presence of worms, it is discarded. But if found perfect, the tassel end is inclosed in a cap C constructed from any suitable material, preferably paper, of any color, the cap being secured to the ear by an adhesive which is repellent to insects. In practice it will be found that a paste composed of flour, salt, extract of clover, and other harmless ingredients, may be employed for the purpose. As shown in Fig. 5, the cap may be made from a blank of trapezoidal outline, thus to permit the cap to assume a conoidal contour on the cob. If desired, the cap may have printed upon it, the name of the grower, followed by his statement that the corn has been duly inspected, or any other data that may be desired. The cap serves as a guarantee to the purchaser, of the inspection of the corn and its high quality. With the foregoing object in view, the stalk end may be similarly equipped with a cap B, held in place by the adhesive above referred to. The caps do away with an inspection of the corn by the purchaser, the corn being taken under the guarantee of the person whose name appears upon the caps. The caps must be destroyed, when they are removed, and thus a reuse of a cap is prevented. In applying the adhesive to the ear, the ends of the ear are preferably dipped into the adhesive to the depth of an inch or so, whereupon the cap is wound about the end of the ear. After the ears have been treated in this manner, they are placed in the box or crate K, which is constructed in such a manner as to permit a thorough ventilation of the ears, and thus eliminate any danger of souring, a feature that must be carefully watched, where corn is shipped to any distance, heat engendered from lack of ventilation, commonly causing the corn to deteriorate rapidly.

The improvements herein disclosed, while simple in character, will be found thoroughly effective for the purposes designed, and will result in a marked saving to venders, and a perfect satisfaction to purchasers.

What is claimed is:—

1. The method of preparing roasting ears to permit inspection of the grains thereof without causing deterioration of the product, which consists in cutting off a length of the tassel end of the ear sufficient to expose the grains, and then inclosing the end in a cap or closure.

2. The method of preparing roasting ears to permit inspection of the grains thereof without causing deterioration of the product, which consists in cutting off a length of the tassel end of the ear sufficient to expose the grains, and then inclosing the end in a cap or closure which is held assembled with the ear by an adhesive that is repellent to insects.

3. The method of preserving green corn on the ear, to present it in such manner as, without deterioration of the product, to permit inspection of the grains, and to standardize the length of the ears, which consists in cutting off a length of the tassel end sufficient to expose the grains, severing the stalk close to the butt end of the ear, and then sealing the tassel end.

4. The method of preserving green corn on the ear, to present it in such manner as, without deterioration of the product, to permit inspection of the grains, and to standardize the length of the ears, which consists in cutting off a length of the tassel end sufficient to expose the grains, severing the stalk close to the butt end of the ear, and then inclosing the ends in caps which are held assembled with the ear by an adhesive repellent to the insects.

5. As a new article of commerce, an ear of green corn having a length of its tassel end removed and the exposed part inclosed in a cap.

6. As a new article of commerce, an ear of green corn having a length of its tassel end removed and the exposed part inclosed in a cap of fibrous material which is held assembled with the ear by an adhesive that is repellent to insects.

7. As a new article of commerce, an ear of green corn having its ends clipped; caps of fibrous material covering the ends of the ear; and an adhesive, repellent to insects, holding the caps upon the ear.

In testimony that I claim the foregoing as my own, I have hereto affixed my signature in the presence of two witnesses.

CLEM L. WATSON.

Witnesses:
KENT V. GAY,
FRANK G. DOGGETT.